Aug. 11, 1931.    P. R. BASSETT ET AL    1,817,907
POSITION COMPARATOR
Original Filed April 13, 1926    3 Sheets-Sheet 1

INVENTORS
PRESTON R. BASSETT
AND
CHESTER B. Mills
BY
ATTORNEY

Aug. 11, 1931.    P. R. BASSETT ET AL    1,817,907
POSITION COMPARATOR
Original Filed April 13, 1926    3 Sheets-Sheet 3
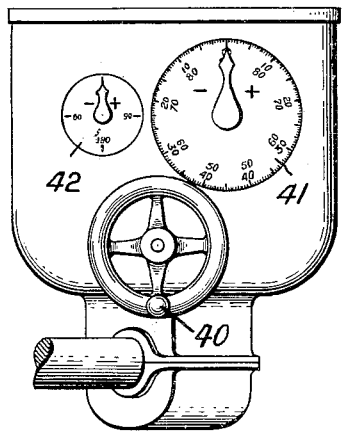
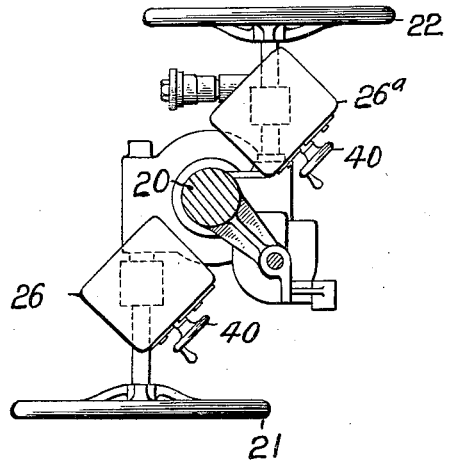
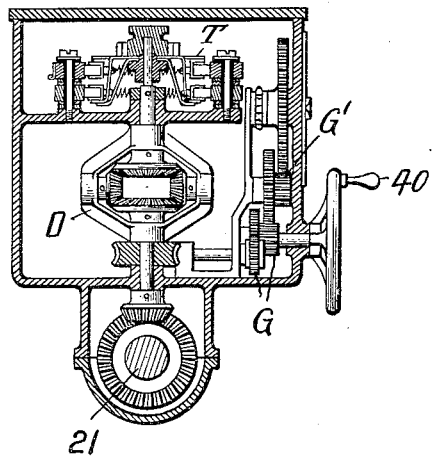
INVENTORS
PRESTON R. BASSETT,
CHESTER B MILLS.
BY
*Herbert H. Thompson*
*their* ATTORNEY.

Patented Aug. 11, 1931

1,817,907

UNITED STATES PATENT OFFICE

PRESTON R. BASSETT, OF ROCKVILLE CENTER, AND CHESTER B. MILLS, OF BROOKLYN, NEW YORK, ASSIGNORS, BY MESNE ASSIGNMENTS, TO THE SPERRY GYROSCOPE COMPANY, INC., OF BROOKLYN, NEW YORK, A CORPORATION OF NEW YORK

POSITION COMPARATOR

Application filed April 13, 1926, Serial No. 101,844. Renewed December 27, 1930.

This invention relates to a device which we term a position comparator and has for its purpose the indication of the relative positions of two movable objects. More specifically our invention relates to such a device for the purpose of comparing the relative positions of an object-detector and a searchlight which is to be trained upon said object. The specific use of our invention relates to the detection of the position of aircraft for the purpose of accurately flashing a searchlight beam upon said craft. For this purpose we employ a sound detector whereby we are enabled to locate accurately the position of an aircraft in azimuth and in elevation by reason of the sound emitted by said craft. Both the sound detector and the searchlight are caused to transmit indications of their positions in azimuth and in elevation to a central instrument, here termed the position comparator, which has its indexes so arranged as to give immediate indications of the relative positions of the object detector and of the searchlight.

Another object of our invention is the provision of an outfit as described above wherein corrections may be made for the movements of the detected objects in both elevation and azimuth so as to anticipate the movements of said object.

Another object of our invention is to provide a combined position comparator and distant controller outfit whereby an operator at the comparator may control the searchlight from a distance to cause said searchlight to take up the proper position so that the beam therefrom will strike the object.

Another object of our invention is the provision of a device of the type described above wherein the operator can make certain that the beam from the searchlight, whenever it is flashed, will travel in the same direction that the operator is facing, and in this manner the operator may avoid facing the beam but will always be facing the target.

Other objects and advantages of this invention will be pointed out in the following detailed description thereof.

In the accompanying drawings,

Fig. 6 is an enlarged view of a means for introducing a correction into the transmitter of the object detector.

Fig. 7 is a plan view showing the two transmitters and means for introducing corrections therein of the object-detecting device.

Fig. 8 is a vertical section through the Fig. 6 device.

Figure 1:
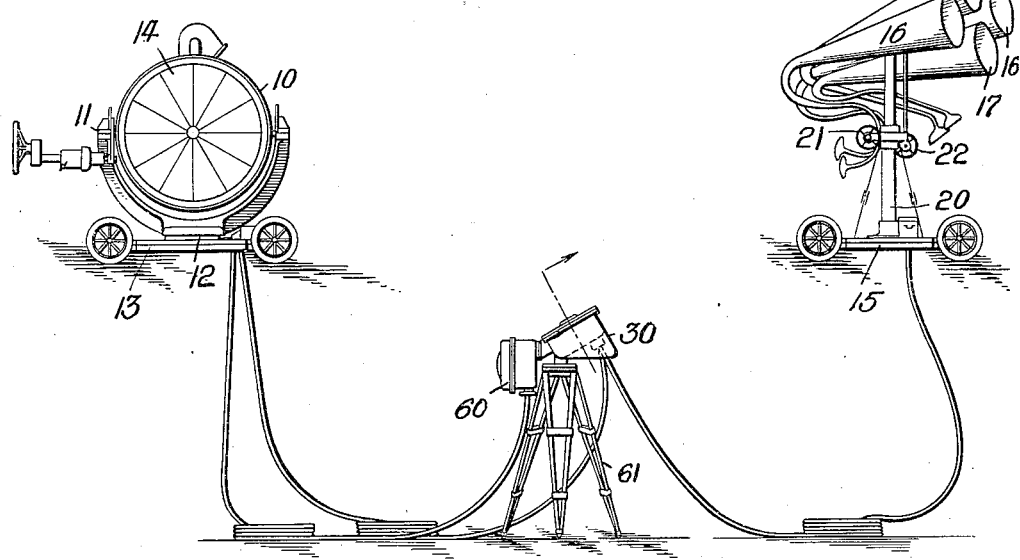
Fig. 1 is an assembly view of the devices comprising our invention.
Figure 2:
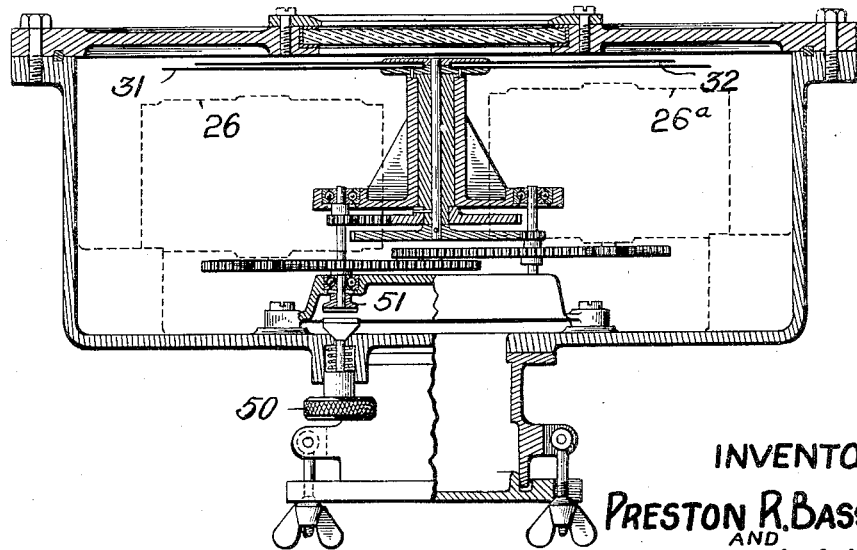
Fig. 2 is a vertical end section through the position comparator of Fig. 1.

Referring to Fig. 1 of the drawings, there is disclosed a high intensity searchlight of the Sperry field type wherein the searchlight drum 10 is mounted for movement on horizontal trunnions 11 and upon a vertical axis 12, the entire device being supported upon a truck 13. The searchlight may be moved about the said axes either by hand or by motors (not shown). The searchlight here shown is especially adapted for use in anti-aircraft operations wherein the light is normally shut off, usually by closing the front shutter 14, and is flashed only when it is desired to pick up an aircraft. For the purpose of accurately locating the position and direction of movement of said aircraft so that the light may be intelligently flashed so as to pick up said aircraft, we provide a sound detector mounted for movement in azimuth and elevation, the detector being shown generally at 15 and having a pair of sound detecting tubes 16 through which the azimuth control operator listens, and tubes 17 through which the elevation control operator listens, the said tubes being supported upon a standard 20. Movement of the tubes about said axis is effected by hand wheels 21 and 22 shown in Figs. 1 and 7.

Figure 3:
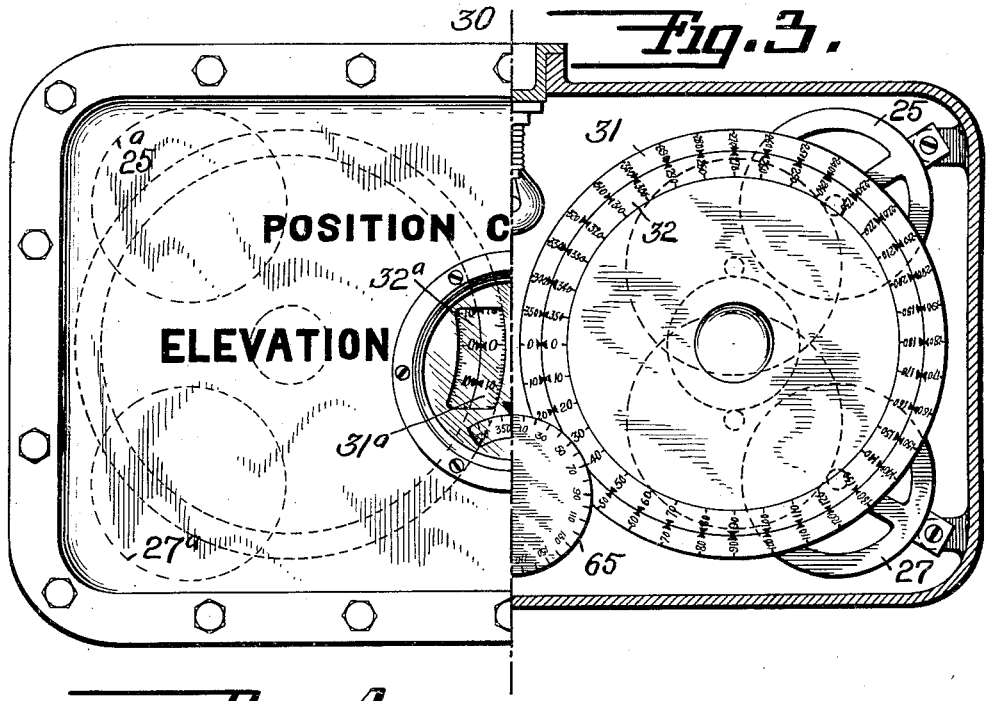
Fig. 3 is a plan view of the comparator with a portion of the top plate removed.
Figure 4:
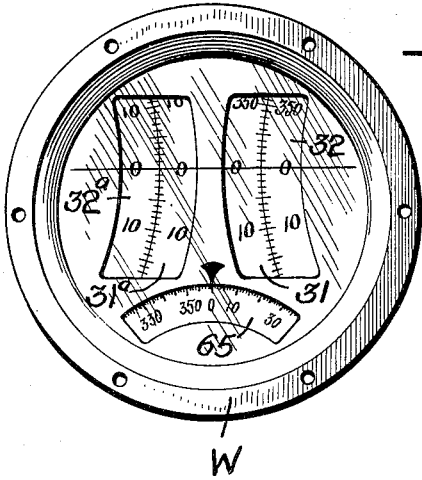
Fig. 4 is an enlarged view of the indicating window and dials of the position comparator.
Figure 5:
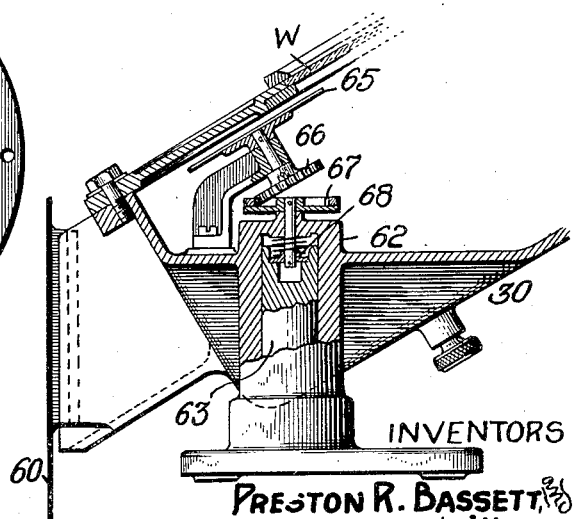
Fig. 5 is a section through the mounting of the position comparator on a support.

Movements of the searchlight about its horizontal and vertical axes is caused to actuate horizontal and elevational transmitters, not shown, to actuate repeater motors 25—25a within the position comparator instrument 30. Similarly operation of hand wheels 21 and 22 are caused to actuate transmitters T which may be of the trolley and contact segment type contained within casings 26 and 26a. Said transmitters actuate repeater motors 27—27a also within the position comparator casing 30. As shown in Fig. 3 the two repeater motors 25—27 corresponding to the movement of the searchlight and sound detector in azimuth are caused to actuate the dials 31 and 32 through suitable gearing as shown. The two dials may be concentric, one of said dials being somewhat larger than the other so that the indications on the two dials will cooperate. Similarly the two repeater motors 25a and 27a, corresponding to the positions of the searchlight and object detector in elevation, are caused to operate a second pair of concentric dials 31—a and 32—a operated through similar gearing between the repeater motors and the dials. In this manner it will be seen that if the searchlight and object detector in elevation, are caused to operate a second pair of concentric dials 31—a and 32—a operated through similar gearing between the repeater motors and the dials. In this manner it will be seen that if the searchlight and object detector are originally positioned in azimuth and elevation so that they have common base lines in the horizontal and vertical planes, then when the dials 31—32 and 31—A, 32—A are in coincidence, the searchlight will be pointing in the same direction as the object detector.

The above described arrangement is sufficient for a stationary object, but in the case of continuously traveling objects, such as aircraft, the position in azimuth and usually also in elevation is constantly changing so that if at any given moment the object detector indicates the craft to be in a given position, flashing the searchlight in the indicated direction would be of no avail because the craft would already have moved to a different position due to the time lag of sound transmission, etc. To take care of the travel of the craft in azimuth and in elevation, it is necessary to anticipate the movements of the craft in the same manner as in gun fire control apparatus where the target is a moving ship. For this purpose we provide means whereby we may introduce a suitable correction in the transmitted azimuth and elevation readings of the object detector. In Figs. 6 to 8, and especially in Fig. 8, we have disclosed one means of introducing said correction. This means may take the form of a differential D interposed between the handle 21 and the transmitter T. The handle 21 operates through the set of gears by rotating the planetary gears on their axes while a handle 40 for introducing the correction operates by turning the entire plenary frame of the differential. In this manner it will be seen that the trolley of the transmitter moves through an angle which is the algebraic sum of the two movements, that is, of the handle 21 and the handle 40. The degree of correction introduced by handle 40 may be controlled at will by suitable gearing G interposed between said handle 40 and the differential. The degree of correction and the direction of said correction may be indicated upon fine and coarse dials 41—42 operated through gearing G′ from handle 40. The reading transmitted by the object detector to the position comparator is, therefore, not the position of the aircraft at that instant but can be made to indicate the position which said aircraft will occupy when the beam is to be flashed a predetermined interval thereafter.

In order to set the searchlight and object detector originally so that they may have the same horizontal and vertical reference planes, the sound detector may be pointed at the searchlight and a sighting tube on said detector may be caused to coincide with a hair line upon the axis of the searchlight. When this is the case, the searchlight and sound detector are, of course, 180° apart in azimuth. The scales 31—32 may, therefore, be adjusted by any suitable hand control means, such as knob 50 which may be pressed into engagement with a member 51 connected to the gearing which operates the respective dial to cause said dial to register the desired indication, which may be zero for one of said objects and 180° for the other, but in any case the indications must be made 180° apart. Similarly the searchlight and sound detector may be adjusted in elevation by means of levels so that when the two devices are level the dials 31—a, 32—a both give the same indication, preferably zero.

Under the above circumstances when the dials are in coincidence flashing of the searchlight will cause the beam to strike the moving craft. We provide means for causing the searchlight to assume the proper position in azimuth and elevation to coincide with the transmitted indications from the sound detector, preferably by means of a distant controller 60 positioned at the sound comparator so that the operator may, while adjusting the position of the searchlight from a distance, observe the dials in the comparator indicating searchlight position, until the two sets of indicators coincide. The form of distant controller is not material to our invention but may be any one of a number of standard types which operate motors at the searchlight for operating said light in azimuth and in elevation such as shown in the patent to House No. 1,708,541 dated April 9, 1929, for distant control mechanism.

The combined position comparator and distant controller may be mounted upon a suitable support, such as a collapsible tripod 61. It may be set up in any desired position, the instrument having a socket 62 adapted to fit over a post 63 projecting upwardly from the tripod. It is desirable that the operator always face in the same direction in which the beam is directed. In order that he may so position himself, we provide means for indicating to the operator the position which he should assume. For this purpose we provide a dial 65 visible through the same window W through which the dials 31—32, 31a—32a are visible and operated through a one-to-one gearing connection 66—67, the gear 66 being fixed to move with the index 65, while the gear 67 is held in fixed position by friction disc 68. When the dials 31—32 have been adjusted so that the searchlight and object detector have a common reference plane in azimuth, the said dials will both read zero. The position comparator casing 30 is then revolved about its post 63 until the dial 65 likewise reads zero. If now the operator finds that he is not facing in the direction of the searchlight he picks up the tripod 61 bodily and moves it together with the comparator casing 30 bodily until his position is such that he faces in the direction of the searchlight beam. Thereafter, if the dials 31—32 indicate that the searchlight has been moved a certain number of degrees in azimuth, the operator may move casing 30 by swivelling on the tripod head to a similar position as indicated on dial 65 and he will then know that he is properly positioned to face in the same direction that the searchlight beam will take when flashed.

In accordance with the provisions of the patent statues, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In combination, a searchlight, means for detecting the direction of an object, a comparator comprising means for indicating the position of the searchlight and cooperating means for indicating the position of said detecting means whereby the relative position of said searchlight and detecting means is also shown, and means whereby said searchlight and said detecting means control the respective indicating means.

2. In combination, a searchlight, a sound detector, a comparator comprising rotatable means for indicating the position of the searchlight and cooperating means concentrically mounted to said first-named means for indicating the position of said detector, means whereby said searchlight and said detector control the respective indicating means for orienting the searchlight from said comparator.

3. In combination, a searchlight, a sound detector, a comparator comprising means for indicating the position of the searchlight, cooperating means for indicating the anticipated position of said detector, and means whereby said searchlight and said detector control the first two of said indicating means.

4. In combination, a searchlight, a sound detector, a comparator comprising rotatable means for indicating the position of the searchlight in azimuth and in elevation and cooperating means concentrically mounted with said first-named means for indicating the position of said detector in azimuth and in elevation, means whereby said searchlight and said detector control the respective indicating means and means for orienting the searchlight from said comparator.

5. In combination, a searchlight, a sound detector, a comparator comprising means for indicating the position of the searchlight and cooperating means for indicating the position of said detector, said means including transmitters actuated by said searchlight and said detector and repeater motors connected to said indicating means whereby said searchlight and said detector control the respective indicating means.

6. In combination, a searchlight, a sound detector for locating the position of moving aircraft, a comparator comprising means for indicating the position of the searchlight in azimuth and in elevation and cooperating means for indicating the anticipated position of said aircraft, means whereby said searchlight controls said first indicating means, and means whereby said detector controls said second indicating means in azimuth and in elevation.

7. In combination, a searchlight, a sound detector for locating the position of moving aircraft, a comparator comprising means for indicating the position of said searchlight and cooperating means for indicating the anticipated position of said aircraft, means whereby said searchlight controls said first indicating means, and means whereby said detector controls said second indicating means, said last-named means including means for introducing a correction for the movement of the aircraft.

8. In combination, a searchlight, a sound detector for locating the position of moving aircraft, a comparator comprising means for indicating the position of the searchlight in azimuth and in elevation and cooperating means for indicating the anticipated position of said aircraft in azimuth and in elevation, means whereby said searchlight controls said first indicating means, and means whereby said detector controls said second indicating means, said last-named means including means for introducing a correction for the movement of the aircraft.

9. In combination, a searchlight, a sound detector for locating the position of moving aircraft, a comparator comprising means for indicating the position of the searchlight in azimuth and in elevation and cooperating means for indicating the anticipated position of said aircraft, means whereby said searchlight controls said first indicating means, and means whereby said detector controls said second indicating means in azimuth and in elevation, said last two means including transmitters actuated by said searchlight and said detector and repeater motors connected to said indicating means.

10. In combination, a searchlight, a sound detector for locating the position of moving aircraft, a comparator comprising means for indicating the position of the searchlight in azimuth and in elevation and cooperating means for indicating the anticipated position of said aircraft in azimuth and in elevation, means whereby said searchlight controls said first indicating means, and means whereby said detector controls said second indicating means, said last-named means including means for introducing a correction for the movement of the aircraft, said last two means including transmitters actuated by said searchlight and said detector and repeater motors connected to said indicating means.

11. In combination, a searchlight, means for detecting the direction of an object, a comparator comprising means for indicating the position of the searchlight and cooperating means for indicating the position of said detecting means whereby the relative position of said searchlight and detecting means is also shown, means whereby said searchlight and said detecting means control the respective indicating means, and distant control means for controlling the position of said searchlight.

12. In combination, a searchlight, a sound detector for locating the position of moving aircraft, a comparator comprising means for indicating the position of the searchlight in azimuth and in elevation and cooperating means for indicating the anticipated position of said aircraft, means whereby said searchlight controls said first indicating means, means whereby said detector controls said second indicating means in azimuth and in elevation, and distant control means for controlling the position of said searchlight.

13. In combination, a searchlight, a sound detector for locating the position of moving aircraft, a combined comparator and distant control means comprising means for indicating the position of said searchlight in azimuth and in elevation, cooperating means for indicating the anticipated position of said aircraft in azimuth and in elevation, and means for controlling the position of said searchlight from said comparator, means whereby said searchlight controls said first indicating means, and means whereby said detector controls said second indicating means, said last-named means including means for introducing a correction for the movement of the aircraft.

14. In combination, a searchlight, a sound detector, a comparator comprising means for indicating the position of said detector, and means whereby said searchlight and detector control the respective indicating means, said searchlight and said detector having a predetermined relation to each other so that coincidence of said indicating means indicates coincidence of direction of said searchlight and said detector.

15. In combination, a searchlight, a sound detector, a comparator, a support for said comparator, said comparator comprising means for indicating the position of said searchlight, cooperating means for indicating the position of said detector, and means for indicating the position of said comparator relative to its support, and means whereby said searchlight, said detector and said comparator control the respective indicating means.

16. In combination, a searchlight, a sound detector, a comparator, a support for said comparator, said comparator comprising means for indicating the position of said searchlight, cooperating means for indicating the position of said detector, and means for indicating the position of said comparator relative to its support, and means whereby said searchlight, said detector and said comparator control the respective indicating means, said searchlight, said detector and said comparator having a predetermined relation to each other.

17. In combination, a seachlight, means for detecting the direction of an object, a comparator comprising means for indicating the position of the searchlight and cooperating means for indicating the position of said detecting means whereby the relative position of said searchlight and detecting means is also shown, means whereby said searchlight and said detecting means control the respective indication means, and manual synchronizing means at the comparator for initially setting the indicating means into a predetermined position.

18. In combination, a searchlight, means for detecting the direction of an object, a comparator comprising means for indicating the position of the searchlight and cooperating means for indicating the position of said detecting means whereby the relative position of said searchlight and detecting means is also shown, means whereby said searchlight and said detecting means control the respective indicating means, distant control means for controlling the position of said searchlight, and manual synchronizing means at the comparator for initially setting the indicating means into a predetermined position.

In testimony whereof we have affixed our signatures.

PRESTON R. BASSETT.
CHESTER B. MILLS.